United States Patent [19]

Rey

[11] Patent Number: 5,272,319
[45] Date of Patent: Dec. 21, 1993

[54] MEMORY HOLDER FOR CREDIT CARD OR THE LIKE

[76] Inventor: Jean-Yves Rey, 102, rue de l'Ermitage, 37100 Tours, France

[21] Appl. No.: 846,491

[22] Filed: Dec. 19, 1991

[51] Int. Cl.⁵ .................. G06F 15/30; G06F 15/02
[52] U.S. Cl. .................. 235/379; 235/380; 235/486; 235/441; 364/705.01; 364/705.06
[58] Field of Search ............ 364/705.01, 705.02, 364/705.06, 706; 235/379, 380, 437, 381, 441, 486, 482, 483; 902/24

[56] References Cited

U.S. PATENT DOCUMENTS

| | | | |
|---|---|---|---|
| 4,587,409 | 5/1986 | Nishimura et al. | 902/22 |
| 4,719,338 | 1/1988 | Avery et al. | 235/379 |

FOREIGN PATENT DOCUMENTS

| | | | |
|---|---|---|---|
| 2629613 | 10/1989 | France | 235/454 |
| 0105381 | 6/1983 | Japan | 235/380 |

*Primary Examiner*—John Shepperd
*Assistant Examiner*—Esther Chin
*Attorney, Agent, or Firm*—Harry M. Weiss

[57] ABSTRACT

A device for holding credit cards, bank cards, charge cards, or any similar type of card is disclosed having a compartment for holding the card, switching elements which are activated by the card, and a warning device that is activated by the switching elements. The holding device also performs calculation via a keypad, a display, a memory, an arithmetic and/or logic processor for keeping track of the financial transactions regarding the use of the card such that before the card is reinserted into the holding device, the warning device alerts the user to update the memory with the latest financial transactions for the card.

33 Claims, 2 Drawing Sheets

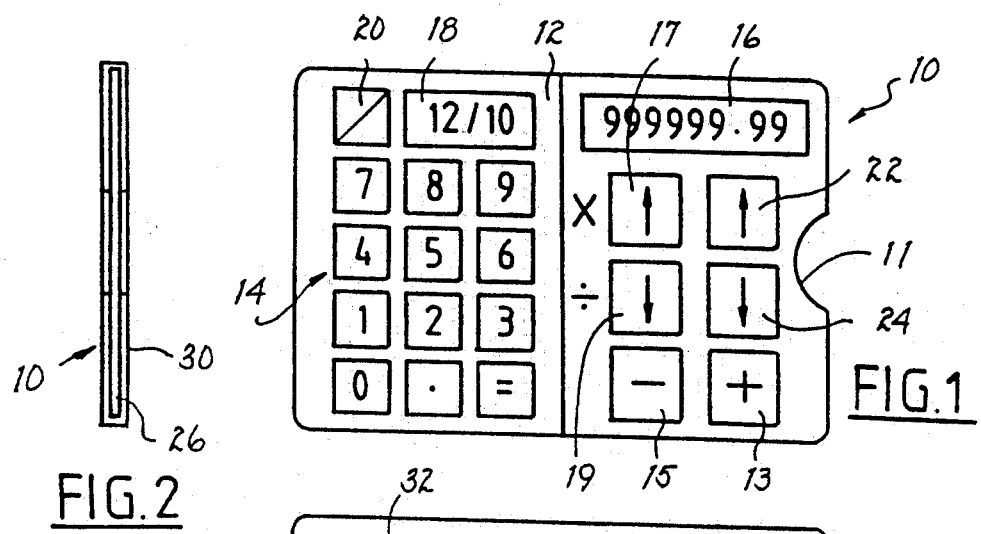
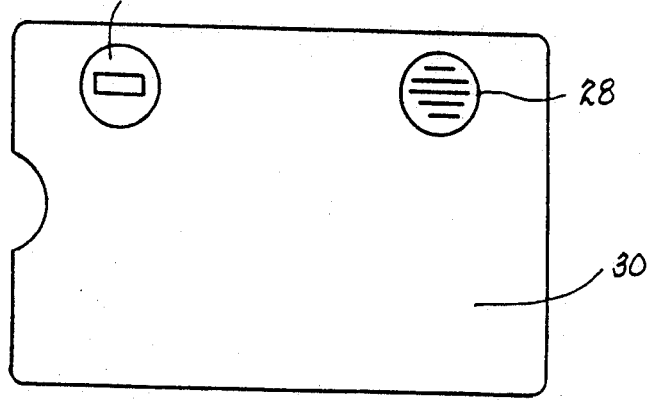
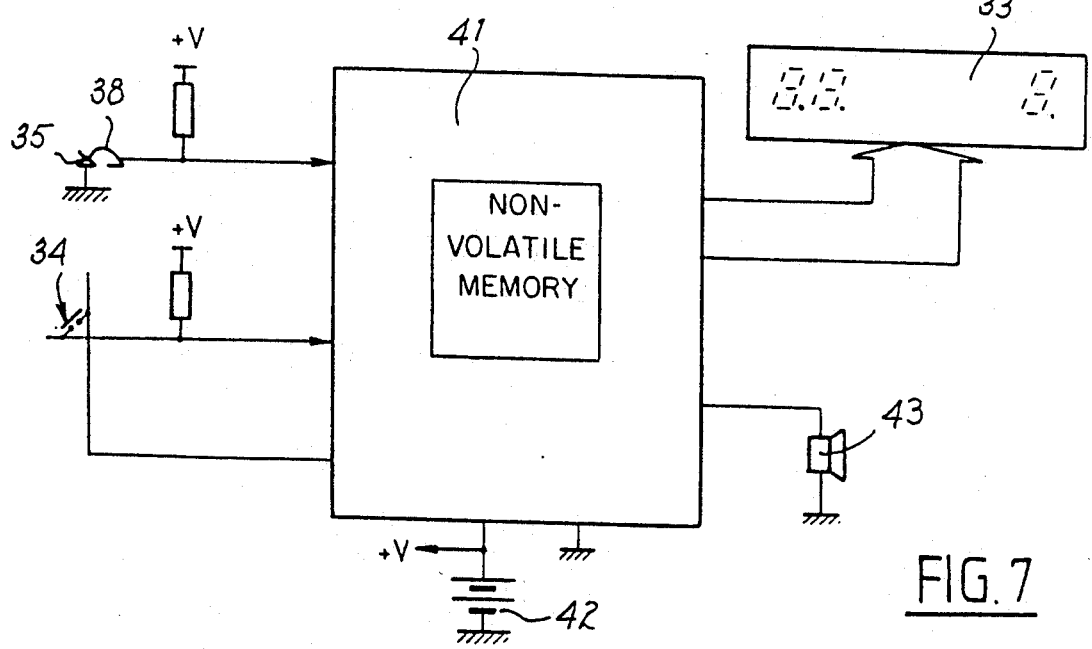

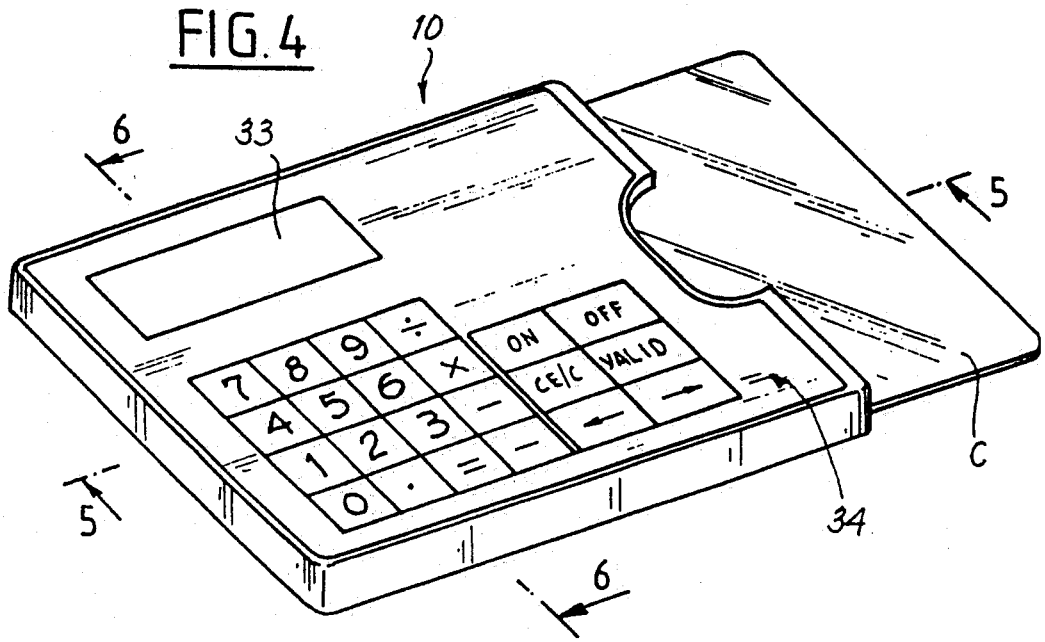
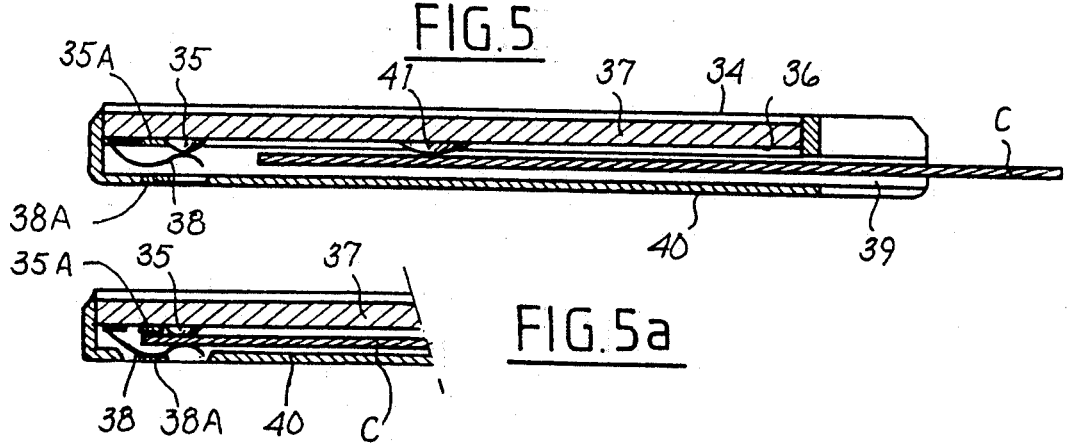
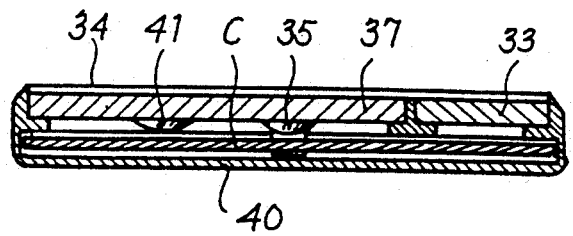

MEMORY HOLDER FOR CREDIT CARD OR THE LIKE

This invention concerns a holder for a credit card or the like.

For the user, credit cards, bank cards, charge cards and the like present the serious disadvantage of not comprising a visual indication of the amount and the date of the operations carried out, and of the outstanding balance, so that the user is obliged to keep an independent record of the operations that he carries out.

Most users, even if they keep such records, which is not always the case, often forget to record the operations, subsequently making it difficult for them to determine the exact amount of their expenditures and the balance of their account.

A proposal has accordingly already been made, for example in U.S. Pat. No. 4,587,409, of a wallet device of which one flap is designed to accommodate calculating means and the second is designed to accommodate a number of credit cards. Such a device is relatively bulky, complex, because designed for several charge cards, but however without enabling its user to contend with the possibility of forgetting to record the operations carried out. In another device of the wallet type, as described in AU-46 568, and consequently also relatively bulky, associated with the flat of the wallet intended to accommodate a credit card are means designed to detect the absence of a card in the compartment intended to accommodate it, and indicating the means designed to generate a signal informing the user of this absence. Hence even such a device fails to solve the problem underlying the present invention, which is that of providing a lightweight, compact device to accommodate and protect a credit card, bank card, charge card or the like, of which the sequence of operations carried out can be recorded, memorized and displayed without any risk of being forgotten by the user.

This problem is solved, in a holder for a credit card, bank card, charge card or the like, comprising a compartment for accommodating said card, switching means arranged in said compartment for activation by said card, and warning means activated by the switching means, by the fact that the holder also comprises calculating means equipped with a memory of which the contents remain in memory even when the calculating means are switched off, arithmetical and/or logic means for carrying out, via a keyboard, operations of which the results are recorded in said memory, and display means for displaying the contents of the memory, and by the fact that the said warning means are connected to the calculating means and to the switching means by a circuit such that the warning means are activated when said card, after having been removed from said compartment, is re-introduced therein, and are turned off by the input of an operation, via said keyboard, into the memory.

The memory preferably comprises several registers in which the results of the operations carried out are chronologically recorded, and dated by means of a clock and a dater associated with the calculating and memory means, the contents of these registers being callable and displayable via the keyboard.

According to one embodiment of the invention, the memory comprises a first register in which the initial amount of the account and the date of recording of this amount are recorded, a second register in which the balance of the account at a second date, also recorded, is recorded, and a series of registers in which the amounts and dates of the operations carried out between the first date and the second date are chronologically recorded.

The advantages offered by the invention can be realized immediately. The user is immediately warned by the warning means, preferably acoustic, when he replaces the card in its holder, that he must enter the amount of the transaction into the memory of the calculating means, so that he does not risk forgetting to carry out this operation.

As a variant, the warning means are activated after removal of the card from its holder and, in such a case, after a certain time interval has elapsed after this removal.

In yet another variant of an embodiment, the warning means are activated either after a certain time interval has elapsed after the removal of the card from its holder, or when the card is re-inserted into its holder.

In a preferred embodiment, the warning means are only turned off when an operation is effectively entered into the memory of the calculating means (the amount entered may be zero, for example, if the card has been removed from the holder by mistake).

The switching means consist, very simply, of reed contacts or, as a variant, of a photocell device.

The user can, at any time, display the contents of the memory and thus learn the balance of his account. In the preferred embodiment according to which the memory comprises several registers, the user can successively call the said registers and display them, so that he thus has a complete record of the operations carried out since the recording of the initial amount, naturally commensurate with the capacity of the memory.

In an advantage embodiment, the memory can only be accessed after a secret code has been entered.

According to the invention, furthermore, the calculating and memory means are organized to enable the cancellation of one or more operations recorded in memory, for example to liberate this memory after checking the operations carried out upon receipt of a bank statement or the like.

Other characteristics and advantages of the invention will appear on a reading of the following description of the preferred embodiments of the invention, which refer to the appended drawing in which:

FIG. 1 is a plan view of the front of a holder according to the invention for a first embodiment, FIG. 2 is an end view, from the right, of the holder in FIG. 1, FIG. 3 is a plan view of the back of the holder in FIG. 1, FIG. 4 is a perspective view of another embodiment, FIG. 5 is a cross-section along 5—5 of FIG. 4, FIG. 5a is a partial view similar to that of FIG. 5, but for another condition of the card, FIG. 6 is a cross-section along 6—6 of FIG. 4, FIG. 7 is a circuit diagram.

One should first refer to FIGS. 1 to 3, which illustrate a first embodiment of a device according to the invention. In this embodiment, the device 10 of a holder for credit card, bank card, charge card or the like (not shown) is of a generally rectangular shape with rounded corners and dimensions very close to those of such a card, i.e. about 85×55 mm. One of the short edges of the holder exhibits an indentation 11 facilitating the insertion and removal of the card into and from the holder, of which the upper side is formed of a built-in calculator 12. This calculator, as shown in FIG. 1, comprises a keyboard 14, a data display screen 16, a data display screen 18, and an ON/OFF switch 20. Keys 13 and 15 for addition and subtraction, respectively, as well as keys 17, 19 and 22, and 24, of which the role is indicated below, are also provided on the front of the calculator 12.

According to a preferred embodiment of the invention, the memory of the calculator 12, of which the contents remain in memory even when the calculator is switched off, comprises several registers in which are respectively recorded the initial amount of the account and the recording date, the latest balance of the account and, in chronological order, the amounts and dates of all the operations carried out since the recording of the initial amount. It is obvious that means can be provided to replace the initial amount, for example, by the latest balance, when the number of operations carried out exceeds the capacity of the memory.

The different registers can be called successively and the contents displayed via keys 17, 19, 22 and 24, the display showing the date thanks to a clock and dates associated with the calculator, and the amount of an expenditure by pressing one of the keys 17, 19 placed above key 15 '−', or a receipt by pressing one of the keys 22 or 24 placed above key 13'+'.

It should be noted that it is also possible, without leaving the framework of the invention, to provide for the use of the calculator 12 for other conventional functions, by temporarily isolating from the calculating circuits the memory registers and the circuits reserved for the recording and handling of the data relative to the operations carried out with the credit card or the like, for example by activating an appropriate function key of the calculator.

The calculating and memory means are also organized to allow the cancellation of one or more operations recorded in memory, for example to liberate the memory after checking the operations carried out upon receipt of a bank statement or the like.

As shown in FIG. 2, the holder 10 comprises an access slot 26, through which the card can be inserted into a compartment designed to accommodate it. Arranged in this compartment is a switch (not shown) which, in a preferred embodiment, is connected to the calculator, and is activated by the credit card or the like when the card is suitably in place.

When the card is removed from the holder and then re-inserted, the signals transmitted by the switch are analyzed by the calculator, which then activates a buzzer 28 preferably arranged in the wall of the back 30 of the holder 10. The buzzer 28 remains activated until an operation is carried out by means of the keyboard of the calculator and entered into memory by means of key '−' for an expenditure or '+' for a receipt.

The calculator then stops the buzzer 28.

Denoted by 32 in FIG. 3 is a battery serving to power the calculator 12 and the buzzer 28.

We shall now refer to FIGS. 4 to 7 illustrating another embodiment. In this embodiment, the holder 10 is similar to the holder of the embodiment described above in reference to FIGS. 1 to 3, but with a different arrangement of the components of the calculator 12, of which the display screen is shown schematically at 33 and the keyboard at 34. In this embodiment, the switching means are provided by an elastic strip 38 and a stud 35 provided on the inner face 36 of a wall 37 carrying the printed circuit of the calculator 12, which limits with a parallel wall 40 the housing 39 for accommodating the credit card, bank card, charge card or the like, C. When the card is completely inserted into the compartment 39, the condition is the one shown in FIG. 5a, in which the card is inserted between stud 35 and strip 38. In this condition, the card C is also positioned opposite a microcontroller 41.

As illustrated in FIG. 7, the microcontroller 41, which contains a clock and a dater, is powered by a battery 42 and is connected to an acoustic alarm 43, the simplest being a piezoelectric buzzer, on the one hand, and to the display device 33 on the other, as well as to the switching means 35, 38 and to the matrix keyboard 34, which can be made in the form of a diaphragm added above the printed circuit 37.

As a variant, the switching means 35, 38 consist of a photocell device 35A, 38A, the operation of the 'mechanical' or 'optical' switching device being the same as that of the device described by the reference to FIGS. 1 to 3 in terms of the operating functions and procedures of the calculator.

I claim:

1. Holder for credit card, bank card, charge card, or charge card comprising:
   a compartment designed to accommodate said card, switching means arranged in said compartment for activation by said card, and
   warning means activated by the switching means, characterized in that the holder also comprises means (12,41) equipped with a memory of which contents remain in memory even when calculating means are switching off, arithmetical and/or logic means for carrying out, via a keyboard (14, 13, 17, 34) operations of which the results are recorded in said memory, as well as means (16,18,33) for displaying the contents of the memory, and in that said warning means (28, 43) are connected to the calculating means (12, 41) and to the switching means (35, 38) by a circuit such that the warning means are activated when said card (C), after having been removed from said compartment (39) is re-inserted therein, and are turned off by the input of an operation, via said keyboard (14, 34) to the memory.

2. Holder as claimed in claim 1, characterized in that the memory comprises several registers in which the results of the operations carried out are chronologically recorded and dated according to a clock and a dater associated with the calculating and memory means (12, 41) and in that the holder comprises means for calling and displaying the contents of each of these registers.

3. Holder as claimed in claim 1, characterized in that the memory comprises a first register in which the initial amount of an account and a first recording date of this amount are recorded, a second register in which the balance of the account and a second recording date are recorded, and a series of registers in which the amounts and dates of the operations carried out between the first recording date and the second recording date are chronologically recorded.

4. Holder as claimed in claim 2, characterized in that the memory comprises a first register in which the initial amount of an account and a first recording date of this amount are recorded, a second register in which the balance of the account and a second recording date are recorded, and a series of registers in which the amounts and dates of the operations carried out between the first recording date and the second recording date are chronologically recorded.

5. Holder as claimed in claim 1, characterized in that the memory can only be accessed after a secret code has been entered.

6. Holder as claimed in claim 2, characterized in that the memory can only be accessed after a secret code has been entered.

7. Holder as claimed in claim 3, characterized in that the memory can only be accessed after a secret code has been entered.

8. Holder as claimed in claim 4, characterized in that the memory can only be accessed after a secret code has been entered.

9. Holder as claimed in claim 1, characterized in that the switching means (35, 38) are at least one of the mechanical and optical type with photocell.

10. Holder as claimed in claim 2, characterized in that the switching means (35, 38) are at least one of the mechanical and optical type with photocell.

11. Holder as claimed in claim 3, characterized in that the switching means (35, 38) are at least one of the mechanical and optical type with photocell.

12. Holder as claimed in claim 4, characterized in that the switching means (35, 38) area at least one of the mechanical and optical type with photocell.

13. Holder as claimed in claim 5, characterized in that the switching means (35, 38) are at least one of the mechanical and optical type with photocell.

14. Holder as claimed in claim 6, characterized in that the switching means (35, 38) are at least one of the mechanical and optical type with photocell.

15. Holder as claimed in claim 7, characterized in that the switching means (35, 38) are at least one of the mechanical and optical type with photocell.

16. Holder as claimed in claim 8, characterized in that the switching means (35, 38) are at least one of the mechanical and optical type with photocell.

17. Holder as claimed in claim 1 characterized in that the calculating means and the memory are organized to enable the cancellation of at least one of the operations recorded in memory.

18. Holder as claimed in claim 2 characterized in that the calculating means and the memory are organized to enable the cancellation of at least one of the operations recorded in memory.

19. Holder as claimed in claim 3 characterized in that the calculating means and the memory are organized to enable the cancellation of at least one of the operations recorded in memory.

20. Holder as claimed in claim 4 characterized in that the calculating means and the memory are organized to enable the cancellation of at least one of the operations recorded in memory.

21. Holder as claimed in claim 5 characterized in that the calculating means and the memory are organized to enable the cancellation of at least one of the operations recorded in memory.

22. Holder as claimed in claim 6 characterized in that the calculating means and the memory are organized to enable the cancellation of at least one of the operations recorded in memory.

23. Holder as claimed in claim 7 characterized in that the calculating means and the memory are organized to enable the cancellation of at least one of the operations recorded in memory.

24. Holder as claimed in claim 8 characterized in that the calculating means and the memory are organized to enable the cancellation of at least one of the operations recorded in memory.

25. Holder as claimed in claim 9 characterized in that the calculating means and the memory are organized to enable the cancellation of at least one of the operations recorded in memory.

26. Holder as claimed in claim 10 characterized in that the calculating means and the memory are organized to enable the cancellation of at least one of the operations recorded in memory.

27. Holder as claimed in claim 11 characterized in that the calculating means and the memory are organized to enable the cancellation of at least one of the operations recorded in memory.

28. Holder as claimed in claim 12 characterized in that the calculating means and the memory are organized to enable the cancellation of at least one of the operations recorded in memory.

29. Holder as claimed in claim 13 characterized in that the calculating means and the memory are organized to enable the cancellation of at least one of the operations recorded in memory.

30. Holder as claimed in claim 14 characterized in that the calculating means and the memory are organized to enable the cancellation of at least one of the operations recorded in memory.

31. Holder as claimed in claim 15 characterized in that the calculating means and the memory are organized to enable the cancellation of at least one of the operations recorded in memory.

32. Holder as claimed in claim 16 characterized in that the calculating means and the memory are organized to enable the cancellation of at least one of the operations recorded in memory.

33. Holder for credit card, bank card, or charge card comprising:
- a compartment designed to accommodate said card,
- switching means arranged in said compartment for activation by said card, and
- warning means activated by the switching means, characterized in that the holder comprises qalculating means (12, 41) equipped with a memory of which contents remain in memory even when the calculating means are switched off, arithmetical and/or logic means for carrying out, via a keyboard (14, 13, 16, 17, 34) operations of which the results are recorded in said memory, as well as means (16, 18, 33) for displaying the contents of the memory, and in that said warning means (28, 43) are connected to the calculating means (12, 41) and to the switching means (35, 38) by a circuit such that the warning means are activated either after a certain time interval has elapsed from a removal of the card from its holder, or when the card is re-inserted into its holder.

* * * * *

UNITED STATES PATENT AND TRADEMARK OFFICE
CERTIFICATE OF CORRECTION

PATENT NO. : 5,272,319
DATED     : December 21, 1993
INVENTOR(S) : Jean-Yves Rey It is certified that error appears in the above-identified patent and that said Letters Patent is hereby corrected as shown below:

Column 4, line 24, claim 1, delete "charge card"

Signed and Sealed this

Fourteenth Day of June, 1994

Attest:

BRUCE LEHMAN

Attesting Officer

Commissioner of Patents and Trademarks